INVENTORS
ROBERT BISHOP
EDWARD E. CASTOR
MICHAEL A. WALKER
WILLIAM W. WORD, JR.

BY Arnold, Roylance + Harris

ATTORNEYS

INVENTORS
ROBERT BISHOP
EDWARD E. CASTOR
MICHAEL A. WALKER
WILLIAM W. WORD, JR.

BY Arnold, Roylance + Harris
ATTORNEYS

United States Patent Office

3,273,915
Patented Sept. 20, 1966

3,273,915
REMOTELY INSTALLED WELL DEVICES AND WELLHEAD ASSEMBLIES INCLUDING THE SAME
Robert Bishop, Edward E. Castor, Michael A. Walker, and William W. Word, Jr., Houston, Tex., assignors to Armco Steel Corporation, Middletown, Ohio, a corporation of Ohio
Filed Aug. 19, 1963, Ser. No. 302,836
2 Claims. (Cl. 285—18)

This invention relates to remotely installed well devices and, more particularly, to improved means for securing together two telescopically related well members. The invention also embraces remotely operated devices for releasing one of two telescopically related well devices and retrieving the released device.

In the drilling and operation of oil and gas wells in accordance with modern practices, it is frequently necessary to install and secure together two telescopically related well members at a point remote from the location of personnel carrying out the operation, and to accomplish the securing operation in such fashion that, having been properly installed and secured, one of the members can thereafter be remotely released and retrieved. In recent years, such requirements have been greatly accentuated because many wells are being installed under water, so that even the wellhead is located at a point remote from the personnel making the installation.

Even in remote installations, it is relatively easy to secure one well member against downward movement relative to a second member telescopically related thereto, this being usually accomplished by the common expedient of providing the members with cooperating shoulders which are brought into engagement automatically upon proper landing of the one member. To secure the one member against upward movement, however, is a more difficult task when the point of installation is remote from the workmen. One manner in which this latter problem has been solved, as disclosed and claimed in copending application Ser. No. 192,172, filed May 3, 1962, now Patent No. 3,171,674, by Paul E. Bickel and William W. Word, Jr., is to provide one of the two telescopically related well members with radially biased latch elements and to provide the other member with a suitable groove into which the latch elements spring automatically when the proper telescopic relation between the two members has been attained. In such arrangements, an annular space is provided either above or below the latch elements and the latch elements have slanting surfaces which extend across this annular space, when the latch elements are properly engaged, so that an annular tool can be run through the annular space to cam the latch elements out of engagement preparatory to retrieval of one of the two members.

While devices constructed in accordance with the aforementioned copending application have proved to be highly successful, the presence of the annular space opening toward the latch elements has been found to cause a distinct problem, particularly in relatively complex subsea wellhead installations, because there is a tendency for debris to collect in this space and prevent entry of the annular tool to cam the latch elements to their disengaged positions. This problem, and the fact that the latch elements are often spaced a substantial distance from the mouth of the annular space, so that a tool with an annular skirt of substantial length has been required for unlatching and retrieval, have developed a need for improvements in devices of this type in the retrieving tools employed therewith. It is a general object of the invention to provide such improvements.

Another object is to devise a latch type securing device characterized by freedom from possible fouling by debris.

A further object is to provide, in well devices of the type described, improved means for accomplishing unlatching preparatory to retrieval.

Yet another object is to provide improved wellhead constructions embodying such securing devices.

In order that the manner in which these and other objects are attained in accordance with the invention can be understood in detail, reference is had to the accompanying drawings, which form a part of this specification, and wherein.

Referring now to the drawings in detail, and first to FIGS. 1-4 thereof, it will be seen that the invention is illustrated here as applied to a wellhead construction adapted for underwater installation and including a generally tubular body member 1. It will be understood that the body member 1, when installed in the wellhead, has its lower end portion 2 seated on a lower body member (not shown) and is clamped to the lower body member in any suitable fashion. At its upper end, the body member 1 supports an upper body member 3, members 1 and 3 being clamped axially together by a power-actuated connector indicated generally at 4. Advantageously, the connector 4 can be constructed in accordance with copending application Ser. No. 264,195, filed Mar. 11, 1963, now Patent No. 2,228,715, by Claude R. Neilon, William W. Word, Jr., and Michael A. Walker.

Figure 1:
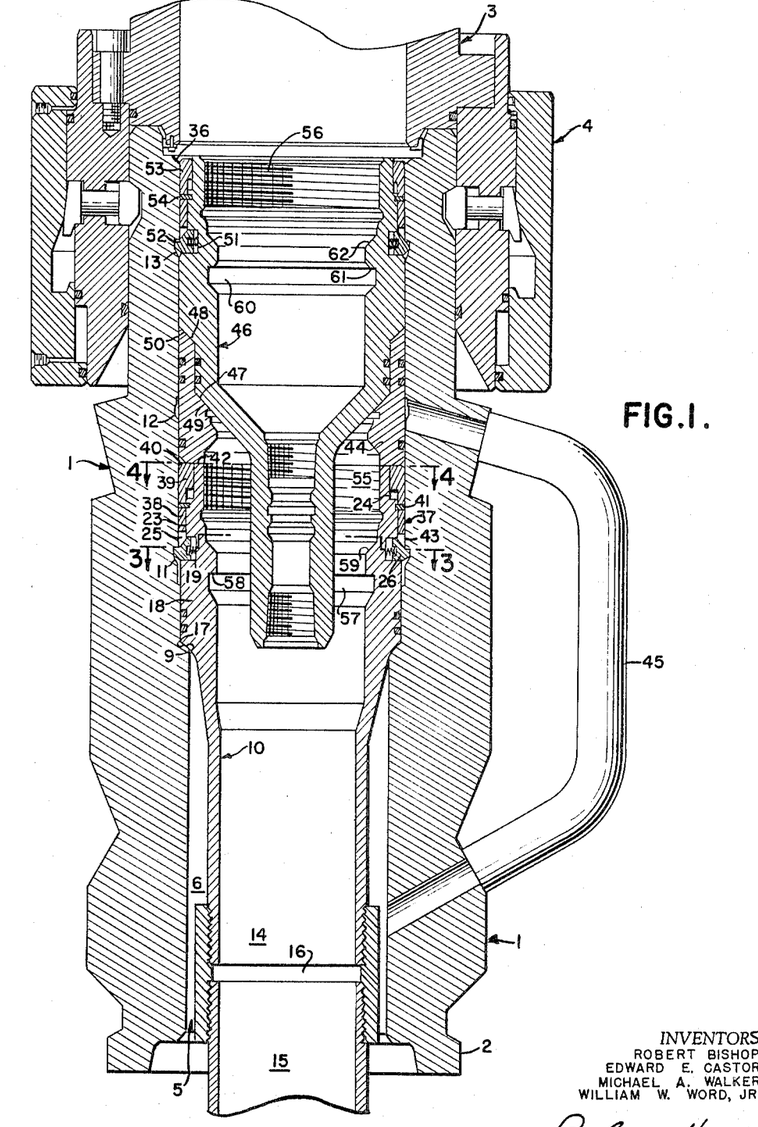
FIG. 1 is a vertical sectional view of one embodiment of the invention, applied to a wellhead construction for remote installation.

Tubular member 1 has an upright passage 5 which extends completely therethrough. At the lower end of member 1, this passage includes a plain cylindrical portion 6. Above the position 6, the passage 5 includes an upwardly directed, downwardly and inwardly slanting frusto-conical shoulder 99 constituting a seat for supporting the casing hanger mandrel indicated generally at 10. Above shoulder 9, passage 5 is cylindrical and of larger diameter, being interrupted only by the inwardly opening transverse annular grooves 11, 12 and 13.

Hanger mandrel 10 is adapted to be inserted downwardly into the passage of outer tubular member 1. The mandrel includes an elongated lower portion 14 which is externally threaded for attachment of the mandrel to the casing 15 to be supported, such attachment being accomplished, for example, by threaded coupling 16. The upper portion of mandrel 10 has a substantially greater wall thickness than does lower portion 14, the two portions being separated by a downwardly and inwardly slanting frusto-conical shoulder 17 adapted to come into face-to-face engagement with the seat 9 as the mandrel is inserted downwardly into member 1.

Immediately above shoulder 17, mandrel 10 includes a portion 18 having an outer diameter such as to substantially fill the corresponding portion of passage 5 when the mandrel is in its seated position. Portion 18 terminates at a transverse annular groove 19 which opens outwardly and is so located with respect to shoulder 17 that, when the mandrel is seated, grooves 11 and 19 open toward each other. Groove 19 has a cylindrical inner wall 20, a flat, circularly extending lower side wall 21, and a flat circularly extending upper side wall 22, side walls 21 and 22 being parallel and spaced apart by a distance such that, taking into consideration the axial position of groove 19, the upper side wall 22 is disposed a material distance above groove 11 when the mandrel is properly seated, as shown. As will be clear from FIGS. 1, 5 and 6, upper wall 22 terminates in a dependent lip 22′ which, as seen in FIG. 5, is interrupted by a gate 22″.

Above groove 19, mandrel 10 presents a cylindrical outer surface portion 23 of larger diameter and a second, upper cylindrical outer surface portion 24 of somewhat smaller diameter than portion 23. It will be noted that surface portion 23 is of materially smaller diameter than is the corresponding portion of passage 5 which surrounds the same. Hence, when mandrel 10 is disposed with shoulder 17 in engagement with seat 9, an upwardly opening annular space 25 is provided which extends from the location of grooves 11 and 19 upwardly to the top of mandrel 10.

Groove 19 slidably accommodates a plurality of arcuate latch segments 26, the segments being arranged in an end-to-end circular series extending completely around the mandrel. Each segment 26 has an inner portion which substantially fills the vertical width of groove 19 and is defined by an arcuate inner surface 27, a flat lower surface 28 and a flat upper surface 29, surfaces 28 and 29 being parallel and disposed in sliding engagement with walls 21 and 22, respectively. Each segment also includes a tip portion adapted for engagement in groove 11 and defined by a downwardly and inwardly slanting surface 30, a flat upper surface 31, and an arcuate surface 32. Surface 31 is spaced materially below surface 29 and so located that, when the mandrel is properly engaged with seat 9, and the latch segment is projected outwardly relative to the mandrel, surface 31 will engage under the transverse annular top wall 33 of groove 11. Between the outer edge of surface 29 and the inner edge of surface 31 extends a downwardly and outwardly slanting, upwardly directed cam face 34. The radial dimensions of surface 31 and cam face 34 are such that, when the segment 26 is engaged in groove 11, with face 32 adjacent the inner wall of the groove, cam surface 34 slants across the bottom of open space 25 so as to be exposed upwardly via this space.

Figure 5:
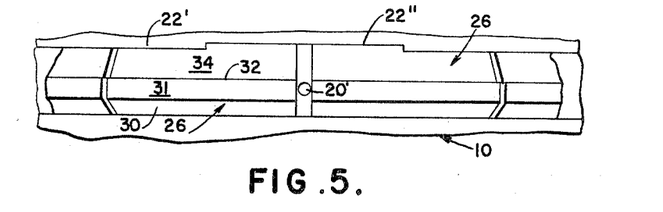
FIG. 5 is a fragmentary side elevational view of a portion of the device shown in FIG. 2.

Referring to FIG. 5, it will be seen that gate 22″ is of such length that each segment 26 can be passed therethrough. In assembly, the segments are simply passed through gate 22″ and then moved endwise along groove 19 until all of the segments are in place. Centrally of gate 22″, a suitable radial bore is provided through inner wall 20. Once all of the segments have been inserted, the series of segments is adjusted until the bore is exposed between the adjacent ends of two of the segments. A pin 20′ is then driven into the bore, a portion of the pin projecting between the ends of the adjacent pair of segments, as shown in FIG. 5, to prevent the segments from shifting to positions such that one would register with gate 22″. In this connection, it will be understood that the total arcuate extent of the segments 26 is less than 360°, so that the pin 20′ is accommodated and the segments are free to slide radially in groove 19. Advantageously, the inner surface of lip 22′ is frusto-conical and disposed at an angle matching that of cam faces 34 when the segments are in place.

Each segment 26 is provided with a plurality of recesses which open through surface 27 and accommodate compression springs 35 engaged with the inner wall 20 of groove 19. As will be clear from FIGS. 1–3, the springs 35 are normally effective to bias segments 26 outwardly, so that the tips of the segments project beyond the confines of groove 19. At its upper end, passage 5 terminates in a downwardly and inwardly slanting frusto-conical surface 36. When mandrel 10 is inserted downwardly into passage 5, the tips of segments 26 first engage surface 36 and are accordingly forced inwardly, against the resilient biasing action of springs 35. The tips then ride along the cylindrical upper portion of the passage, successively snapping into and being cammed out of the grooves 13 and 12 as the mandrel continues its downward movement toward seat 9. In this connection, it will be observed that each of the grooves 11–13 has a downwardly and inwardly slanting frusto-conical lower wall, capable of coacting with the lower surfaces 30 of the tips of the latch segments 26 in such fashion as to cam the segments inwardly as downward motion of the mandrel progresses. Accordingly, the arrangement is such that the tips of the latch segments 26 can simply follow the configuration of the upper portion of passage 5 until shoulder 17 comes into proper engagement with seat 9, at which time all of the latch segments 26 are urged outwardly into latching engagement in groove 11. Thus, once the mandrel has been properly landed, automatic engagement of the latch segments in groove 11 serves to prevent upward movement of the mandrel.

Embracing the upper portion of mandrel 10 is a rigid sleeve 37 which serves both to close annular space 25 against entry of debris and to engage cam faces 34 to accomplish retraction of the latch segments from groove 11 when the mandrel is to be withdrawn upwardly from head member 1. Sleeve 37 includes a lower cylindrical portion 38 of such diameter and thickness as to effectively fill space 25. The sleeve also includes an upper cylindrical portion 39 which is of such thickness as to bridge the space between the uppermost outer surface portion 24 of the mandrel and the surrounding portion of passage 5. The upper end of sleeve 37 is defined by an upwardly directed flat transverse annular end face 40.

When the mandrel 10 is prepared for insertion into the wellhead, sleeve 37 is initially secured in place by a shear pin 41, the location of the shear pin being such that upper end face 40 of sleeve 37 lies in the same transverse plane as upper end face 42 of the main body of the mandrel. With the shear pin retaining the sleeve in this position, the transverse annular lower end face 43 of the sleeve is spaced slightly above cam faces 34 of the latching segments 26. Also, with the sleeve in this initial position, there is substantial free space between the shoulder joining portions 38 and 39 of the sleeve and the opposing shoulder joining surface portions 23 and 24 of the upper end portion of the mandrel body. Accordingly, when adequate downward force is applied to sleeve 37 to rupture shear pin 41, the arrangement is such that the sleeve can slide downwardly in space 25 so that the lower end face 43 of the sleeve simultaneously engages cam faces 34 of all of the latching segments and so forces all of the latching segments radially inwardly to retract the same from groove 11. In this connection, it will be observed that, when the latching segments are fully engaged in groove 11, there is sufficient space between the inner surfaces 27 of the segments and the inner wall 20 of groove 19 to allow the radial inward movement of the segments necessary for full retraction and disengagement from groove 11.

The next inner element above mandrel 10 in the wellhead assembly may be a sealing ring 44 which is seated on upper end face 42 of the mandrel body and fills passage 5 to block the upper ends of by-pass ducts 45. In the assembly illustrated, the sealing ring 44 also serves to support the tubing hanger mandrel indicated generally at 46. Thus, sleeve 44 is of such configuration as to present upwardly facing transverse annular seats 47 and 48, and the mandrel 46 has cooperating transverse annular downwardly facing shoulders 49 and 50, respectively.

The tubing hanger mandrel 46 is provided with an outwardly opening transverse annular groove 51 which accommodates an annular series of arcuate latch segments 52, segments 52 being in all respect identical to segments 26 as hereinbefore described. Groove 51 so located that, when tubing hanger mandrel 46 is properly landed, with its shoulders 49 and 50 respectively engaging the seats 47 and 48 presented by ring 44, groove 51 opens toward groove 13 so that the springs associated with segments 52 are effective to urge those segments outwardly into latching engagement in groove 13. Exteriorly, the upper end portion of tubing hanger mandrel 46 has the same configuration as does the upper end portion of hanger mandrel 10, and a rigid sleeve 53, in all respect identical with sleeve 37, embraces the upper end portion of the tubing hanger mandrel. Sleeve 53 is normally retained in an upper, inactive position, out of engagement with segments 52, by a shear pin 54. It will thus be apparent that, in its own location, sleeve 53 serves the same dual purposes as does sleeve 37.

The upper end portion of mandrel 10 is internally threaded, as indicated at 55, and the upper end portion of tubing hanger mandrel 46 is similarly internally threaded, as indicated at 56. In a location below groove 19, the mandrel 10 is provided with a transverse annular inwardly opening groove 57 having a flat transverse annular upper wall 58. Immediately above groove 57, mandrel 10 has an internal transverse annular upwardly directed seat 59. Similarly, tubing hanger mandrel 46 is provided with a transverse annular inwardly opening groove 60 having a flat transverse upper wall 61. Above groove 60, mandrel 46 has an upwardly directed transverse annular seat 62.

Figure 6:
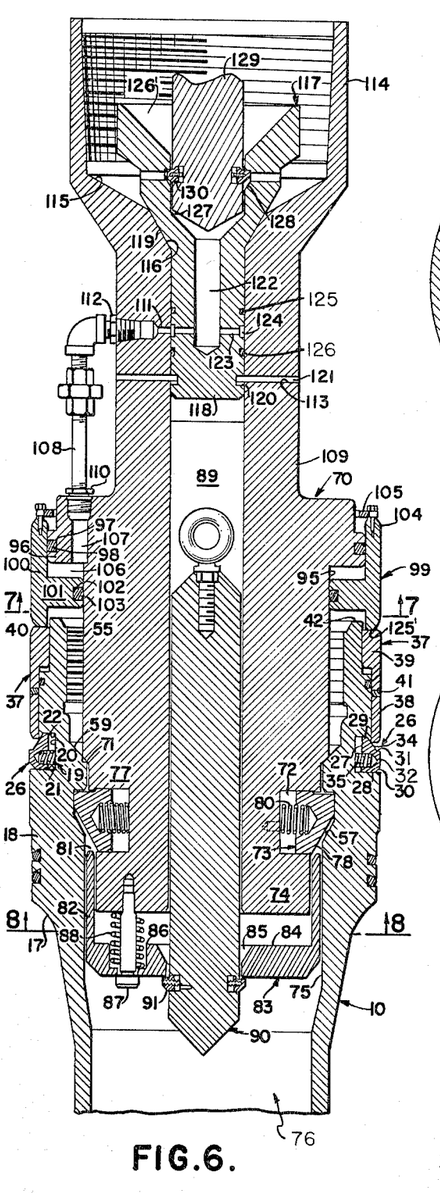
FIG. 6 is a vertical sectional view of a tool constructed in accordance with the invention for retrieving the casing hanger mandrel of FIG. 2 from the wellhead.
Figure 7:
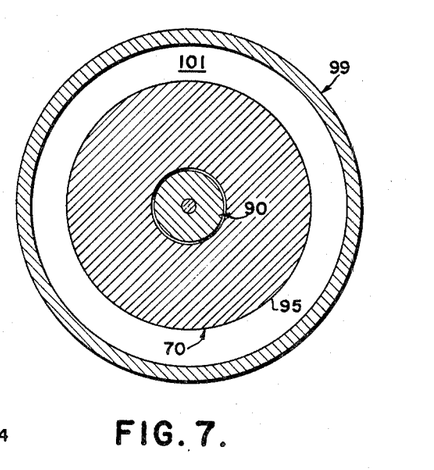
FIG. 7 is a transverse sectional view taken on line 7—7, FIG. 6.
Figure 8:
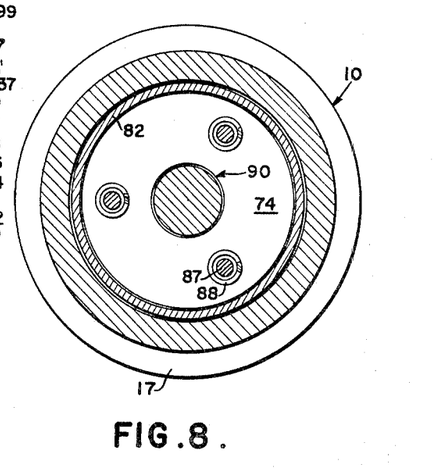
FIG. 8 is a transverse sectional view taken on line 8—8, FIG. 6.

One particularly advantageous embodiment of a re-retrieving tool in accordance with the invention is illustrated in FIGS. 6–8, the tool being shown as engaged with the casing hanger mandrel 10 for retrieval thereof. The retrieving tool comprises a main body indicated generally at 70 and having a lower end portion adapted for downward insertion into the passage of the casing hanger mandrel. Body 70 presents a transverse annular downwardly facing shoulder 71 adapted for engagement with seat 59. Below shoulder 71, the body is provided with a transverse annular outwardly opening groove 72 which accommodates a plurality of arcuate latching segments 73. Below groove 72, the body 70 has a cylindrical portion 74 of materially smaller diameter than the corresponding portion 75 of the passage 76 of mandrel 10. Above groove 72, portion 77 of the body 70 is of such diameter as to substantially fill the passage 76 adjacent seat 59.

Latch segments 73 are generally similar to latch segments 26, hereinbefore described, except that the lower downwardly and inwardly slanting faces 78 of segments 73 are employed as the cam faces by means of which the segments can be retracted. Each segment 73 has a flat surface 79 which defines the upper face of the tip of the segment and is adapted to be engaged below the flat upper wall 58 of groove 57. For each segment 73, a compression spring 80 is provided to bias the segment outwardly.

Since the cylindrical lower tip portion 74 of body 70 is of smaller diameter than is mandrel bore portion 75, a downwardly opening annular space 81 is provided immediately below the cam faces 78 of the segments 73 when body 70 is seated on shoulder 59. Slidably engaged in space 81, and substantially filling the same, is the skirt 82 of a segment retractor member indicated generally at 83. Member 83 includes a circular base 84 having a central opening 85 and three openings 86 which are spaced in a circular series concentric with the central opening. Each opening 86 includes a portion of larger diameter, which opens toward body 70, and a portion of smaller diameter, which opens away from body 70. Three screws 87 extend each through a different one of the openings 86 and are engaged in suitable threaded openings provided in the bottom end of body 70. The larger portion of each opening 86 accommodates a compression spring 88 which surrounds the corresponding screw 87, the springs 88 acting between the bottom end face of body 70 and the base 84 of member 83 to bias actuating member 83 downwardly. When the retrieving tool has been landed, so that shoulder 71 of body 70 engages seat 59, a wire line tool 90, equipped with outwardly biased latch segments 91, can be passed downwardly through bore 89 and central opening 85 of member 83, the latch segments 91 then springing outwardly to engage beneath the base 84 of actuating member 83, as shown in FIG. 6. Accordingly, though landing of the retrieving tool on seat 59 causes segments 73 to snap outwardly into groove 57 so that body 70 is held against withdrawal from mandrel 10, the latching segments 73 can be released by lowering the wire line tool 90 until latch segments 91 are engaged beneath member 83 and then pulling upwardly on the wire line to cause member 83 to move toward body 70, so that skirt 82 engages the cam faces 78 of latching segments 73 and forces the latching segments inwardly until they are disengaged from groove 57. The retrieving tool can then be removed, leaving mandrel 10 in place.

Above shoulder 71, body 70 presents a right cylindrical outer surface portion 95 which is substantially longer than is the portion of mandrel 10 above seat 59. At the upper end of surface portion 95, body 70 is provided with a circular outwardly projecting flange 96 which is concentric with the central axis of body 70. An outwardly opening groove 97 is provided in the periphery of flange 96 and accommodates an O-ring 98. Cooperating with flange 96 and cylindrical surface portion 95 is an actuator ring indicated generally at 99. Ring 99 includes a right cylindrical, tubular portion 100 having an inner diameter such the inner surface thereof slidably embraces flange 96. The actuator ring also comprises an inwardly projecting annular flange 101 having an inner diameter such as to slidably embrace the cylindrical surface portion 95 of body 70. The cylindrical inner face of flange 101 is provided with an inwardly opening groove 102 accommodating an O-ring 103. The upper end portion 104 of ring 99 projects above flange 96 and carries a rigidly attached, inwardly projecting ring 105 which, because engageable with the upper face of flange 96, is effective to retain ring 99 on body 70.

Since portion 100 of ring 99 slidably engages the periphery of flange 96, while flange 101 slidably engages surface 95, and since O-rings 98 and 103 provide fluid-tight seals, it will be clear that the ring 99 and adjacent portions of body 70 cooperate to define an expansible chamber 106. Body 70 is provided with at least one axially extending duct 107 which opens into chamber 106 and to which is connected a fluid-supply conduit 108. In this embodiment of the tool, a portion 109 of body 70 above flange 96 is of smaller outer diameter than outer surface portion 95, so that bore 107 opens upwardly and conduit 108, located exteriorly of the tool body, can be connected to bore 107 by a suitable threaded fitting 110. Body portion 109 is provided with a lateral duct 111 and the remaining end of conduit 108 is connected to that duct via a suitable threaded fitting 112. Below duct 111, body portion 109 of the tool is provided with a plurality of radially extending bores 113 lying in a common transverse plane.

The upper end of body 70 is in the form of an internally threaded tool point 114 by which the retrieving tool can be connected to a string of handling pipe (not shown). The interior of joint 114 includes concentric downwardly and inwardly slanting frusto-conical portions 115 and 116.

When the retrieving tool is first prepared for use, a hollow plug indicated generally at 117 is installed. Plug 117 includes a lower cylindrical tip portion 118 of a diameter such as to be snugly accommodated in the upper end portion of through bore 89. Above tip portion 118, the plug includes a downwardly and inwardly slanting frusto-conical shoulder portion 119 adapted to seat on the shoulder presented at 116. An outwardly opening transverse annular groove 120 is provided in tip portion 118 and so located that, when the plug is seated with surface 119 engaging surface 116, the groove 120 will open toward the radial bores 113. The plug is initially retained in place by a plurality of shear pins 121 each extending through a different one of the bores 113 and projecting inwardly to engage in groove 120.

Plug 117 is provided with an axially extending bore which opens through the top of the plug and extends downwardly into tip portion 118, terminating short of the lower end of the tip portion. Thus, the bore includes a lower portion 122. A plurality of radially extending ducts 123 lead outwardly from bore portion 122, communicating with an outwardly opening transverse annular groove 124 in tip portion 118. The location of the ducts 123 and groove 124 is such that, when surface 119 engages surface 116, groove 124 opens toward duct 111 and duct 111 is therefore placed in communication with bore portion 122 via ducts 123. Two external transverse annular grooves are provided in tip portion 118 of the plug, one being located above groove 124 and the other therebelow. These two grooves accommodate O-rings 125 and 126 to establish fluid-tight seals between the tip portion 118 and the wall of bore 89. Accordingly, assuming that body 70 is connected to a handling string of pipe via joint 114, and that the upper portion of the bore in plug 117 is open, it will be clear that fluid supplied under pressure via the string of handling pipe will pass through bore portion 122, ducts 123 and 111, conduit 108, and duct 107 into the expansible chamber 106 to apply pressure downwardly to the actuator ring 99.

The cylindrical tubular portion 100 of ring 99 projects below flange 101 to present a downwardly facing transverse annular surface 125. The dimensions of ring 99 are such that end surface 125' is opposed to the transverse annular upwardly directed end face 40 of sleeve 37 carried by the casing mandrel 10. Accordingly, when the ring 99 is actuated downwardly by pressure fluid supplied via the handling string, ring 99 comes into engagement with sleeve 37 and applies thereto a force adequate to rupture shear pin 41. Continued application of fluid pressure to expansible chamber 106 therefore causes both ring 99 and sleeve 37 to move downwardly, relative to the retrieving tool and mandrel which, of course, are both still fixed against movement at this stage. The downward movement of sleeve 37 thus accomplished is effective to bring the lower end face 43 thereof into simultaneous engagement with all of the cam faces 34 of latch segments 26, so that the latch segments are forced radially inwardly and out of engagement with the groove 11 in member 1. As will be clear from FIG. 6, downward movement of actuator ring 99 and sleeve 37 terminates when the inner faces 27 of segments 26 come into engagement with the inner wall 20 of groove 19. The segments 26 now being fully retracted, casing mandrel 10 can be removed simply by pulling upwardly on the handling string to which joint 114 is connected. In this regard, it is to be noted that the outer cylindrical surfaces of ring 99 and sleeve 37 are of such diameter as to be capable of sliding freely along the upper portion of passage 5 in member 1 so that, segments 26 being fully retracted, nothing is presented to impede the upward movement of the combination of the retrieving tool and casing hanger mandrel. Assuming that full retraction of latch segments 26 has been accomplished as just described, then segments 73 will, of course, have been left fully engaged in groove 57 so that the retrieving tool body 70 still remains securely latched to the mandrel 10.

The upper portion of plug 117 presents a downwardly and inwardly slanting frusto-conical guiding surface 126 and an enlarged bore portion 127, the latter being provided with an inwardly opening transverse annular groove 128. Assuming that it is necessary or desirable to remove the plug 117 while leaving body 70 latched to mandrel 10, a wire line tool 129 can be passed downwardly through the handling string so that the tip of tool 129 engages in bore portion 127. Tool 129 is provided with a plurality of outwardly biased latch pins 130 capable of engaging in groove 128. With pins 130 so engaged, an upward strain applied to wire line tool 129 will be effective to rupture shear pins 121 and allow free withdrawal of plug 117. When that has been accomplished, it is then possible to pass wire line tool 90 downwardly through the handling string until latch pins 91 engage beneath actuating member 83. It is thus possible to accomplish unlatching of the retrieving tool from casing mandrel 10 so that the retrieving tool can be recovered without retrieving the casing hanger mandrel.

Referring again to FIG. 1, it will be noted that groove 61 and shoulder 62 in tubing hanger mandrel 46 have the same dimensional and positional relationships as do the corresponding groove 57 and shoulder 59 in casing hanger mandrel 10. Further, sleeve 53 has the same dimensional and positional relationships as does sleeve 37. Accordingly, the retrieving tool illustrated in FIGS. 6–8 obviously can be employed as well as to accomplish unlatching of the tubing hanger mandrel 46, and retrieval thereof, as to accomplish the same operations with the casing hanger mandrel.

Figure 9:
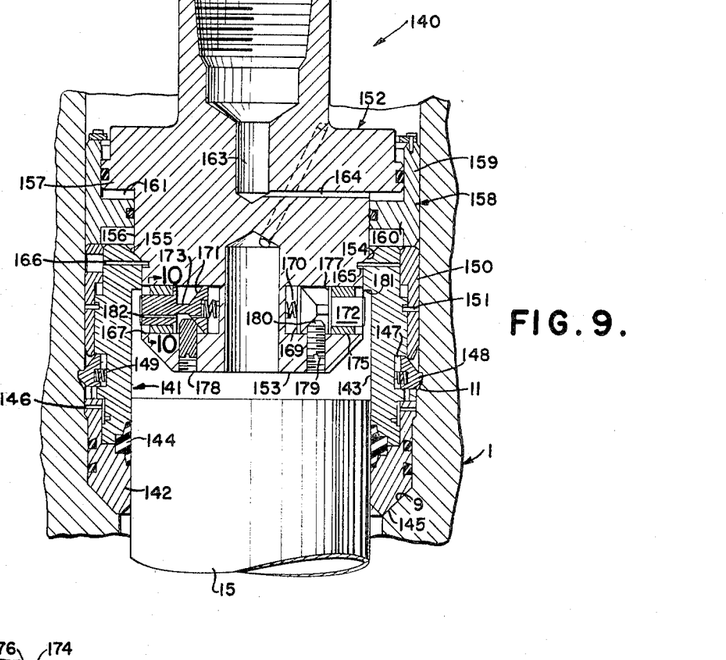
FIG. 9 is a vertical sectional view of another tool constructed in accordance with the invention for handling a seal device for packing off between a casing and a surrounding well member.

FIG. 9 illustrates a handling tool constructed in accordance with another embodiment of the invention and also shows that such tools can be employed for landing and retrieving of various well devices other than the hanger mandrel discussed with reference to the tool disclosed in FIG. 6. Indicated generally at 140, the handling tool illustrated in FIG. 9 is useful for both landing and retrieving a sealing device 141 which can be employed, for example, to pack off between the casing 15 and the interior of body member 1 above shoulder 9.

Sealing device 141 includes a lower ring member 142, an upper ring member 143 and an annular packing element 144. Lower member 142 has a downwardly and inwardly slanting frustoconical lower end face 145 dimensioned to seat on shoulder 9 of member 1. Upper member 143 has a lower portion of smaller diameter which is slidably embraced by the upper portion of lower member 142, the two ring members being initially held in extended position by shear pins 146. With shear pins 146 intact, the cooperating surfaces of members 142 and 143 define an inwardly opening transverse annular recess which is adequately large to retain packing element 144 in its relaxed condition. However, when member 142 is seated on shoulder 9 and a downward force is applied to upper member 143, rupturing the shear pins, the two ring members are telescoped relative to each other so that the packing-accommodating recess is reduced in size and the packing is accordingly energized to sealing engagement with the outer surface presented by the top of casing 15.

Figure 2:
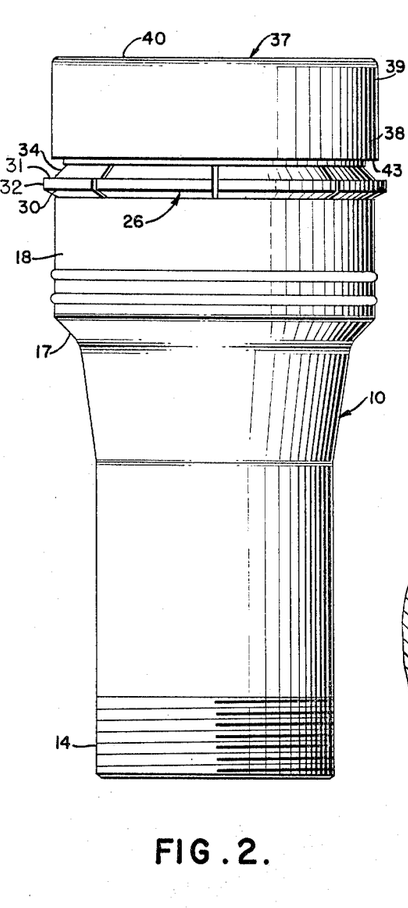
FIG. 2 is a side elevational view of a casing hanger mandrel employed in the aparatus of FIG. 1.
Figure 3:
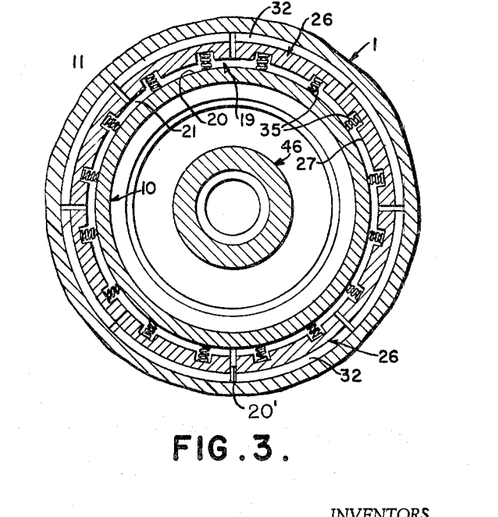
FIG. 3 is a transverse sectional view taken on line 3—3, FIG. 1.
Figure 4:
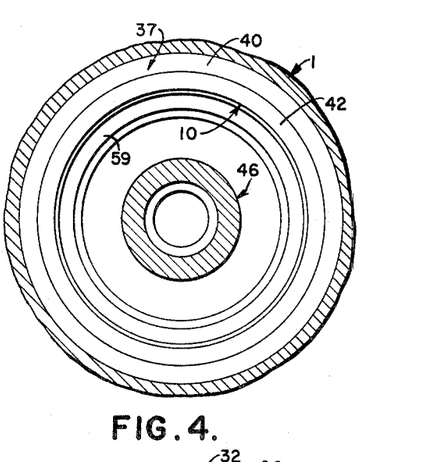
FIG. 4 is a transverse sectional view taken on line 4—4, FIG. 1.

Upper member 143 is provided with a transverse outwardly opening groove 147 which retains an annular series of arcuate latch segments 148 identical with the latch segments 26 described with reference to FIGS. 1, 2 and 6. The dimensions of the two ring members, and the disposition of groove 147, are such that, when upper member 143 is forced downwardly until latch segments 148 can engage in groove 11 of member 1, packing 144 is properly energized. Latch segments 148 are biased outwardly by springs 149 so that, when the sealing device is properly landed by tool 140 in the manner hereinafter described, the latch segments will spring automatically into engagement with groove 11. The upper end portion of ring member 143 is slidably embraced by a rigid sleeve 150 which is identical with sleeve 37 of FIGS. 1, 2 and 6. Sleeve 150 is initially held in raised, inactive position by shear pins 151 but can be actuated downwardly to accomplish retraction of the latch segments 148, as hereinafter described.

Tool 140 comprises a main body 152 having a lower end portion 153 of such diameter as to be snugly received within the upper end portion of ring member 143. Above portion 153, body 152 is provided with a transverse annular downwardly and inwardly slanting shoulder 154 disposed to seat on a cooperating shoulder 155 provided at the upper end of ring member 143. Above shoulder 154, body 152 has a cylindrical outer surface portion 156 which extends upwardly to an outwardly projecting annular flange 157.

Actuating ring 158, comprising a cylindrical portion 159 and an inwardly directed transverse annular flange 160, surrounds the tool body above shoulder 154. The upper portion of cylindrical portion 159 slidably embraces the periphery of flange 157, while the circular inner edge of flange 160 slidably embraces cylindrical outer surface portion 156 of the tool body. Surface portion 156, flange 157, cylindrical portion 159 and flange 160 cooperate to define an expansible chamber 161 in such fashion that, when fluid under pressure is supplied to the expansible chamber, actuating ring 158 is forced downwardly relative to body 152. The lower tip of cylindrical portion 159 of the actuating ring is dimensioned to come into direct engagement with the upper end surface of sleeve 150. Hence, such downward movement of the actuating ring accomplishes downward movement of sleeve 150, so that the shear pins 151 are ruptured and sleeve 150 is forced into engagement with the cam faces of segments 148 to cause the segments to be retracted from groove 11.

At its upper end, tool body 152 carries an upwardly projecting, interiorly threaded tubular portion 162 by which the tool body can be connected to a string of handling pipe (not shown). At the bottom of portion 162, an axially directed, upwardly opening bore 163 is provided, bore 163 communicating with the expansible chamber 161 via at least one radial duct 164. Accordingly, when the tool 140 is connected to a string of handling pipe, fluid supplied under pressure down the string of handling pipe is directed to expansible chamber 161, via the interior of portion 162, bore 163 and duct 164, to provide actuation of ring 158.

At a suitable point below the top of shoulder 154, tool body 152 is provided with a transverse annular outwardly opening groove 165 disposed to be engaged by a plurality of shear pins 166 extending through suitable radial bores in the upper end portion of ring member 143 of the sealing device. With shear pins 166 properly in place, the tool 140 and the upper ring member 143 of the sealing device are rigidly coupled so that the sealing device can be properly landed by manipulating the string of handling pipe to which the tool 140 is attached. Once the sealing device has been landed and latch segments 148 are engaged in groove 11, an upward strain can then be applied to the handling pipe in order to rupture shear pins 166 and free the tool 140 for retrieval.

Figure 10:
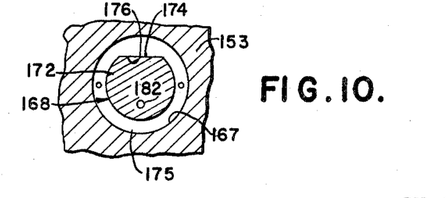
FIG. 10 is a detail sectional view taken on line 10—10, FIG. 9.

Lower end portion 153 of body 152 is provided with a plurality of outwardly opening cylindrical recesses 167 each accommodating a latch pin 168. Each latch pin 168 comprises an inner circular end portion 169 provided with an axially opening recess which accommodates one end of a compression spring 170 disposed to bias the latch pin outwardly. Portion 169 presents an outwardly tapering frusto-conical cam surface 171 and, at its outer end, is joined to the tip portion 172 of the latch pin by a stem 173 which is of reduced diameter. As seen in FIG. 10, the tip portion 172 of each latch pin is generally cylindrical but has a flat surface 174. The outer end of each recess 167 is threaded to receive an exteriorly threaded ring 175. The inner surface of ring 175 corresponds in shape to the outer surface of tip portion 172 and is so provided with a flat surface portion 176, FIG. 10. Each ring 175 is so installed that the corresponding latch pin 168 will be retained with its flat tip surface 174 facing upwardly. Inwardly of ring 175, each latch pin 168 is provided with a transverse annular flange 177 to engage the inner end face of the ring 175 so as to retain the latch pin in its recess 167.

Lower body portion 153 is also provided with a plurality of axially extending threaded bores 178 each opening radially into a different one of the cylindrical recesses 167. Each bore 178 accommodates a screw 179 having a frusto-conical tip portion 180 dimensioned to come into flush engagement with the cam face 171 of the latch pin retained in the corresponding recess. The positions of bores 178 on body 152 and the locations of cam faces 171 on latch pins 168 are so chosen that, with the latch pins and rings 175 properly installed, as shown, so that the springs 170 urge the latch pins to cause flanges 177 to engage rings 175, then threading of the screws 179 through bores 178 will bring the frusto-conical tip surfaces 180 of the screws into camming engagement with the respective cam faces 171 of the latch pins and cause full retraction of the latch pins, so that the pins do not project beyond the circumference of lower end portion 153 of the tool body. Hence, with the latch pins so fully retracted, lower end portion 153 of the tool body can be fully inserted into the upper portion of ring member 143 of the sealing device, so that shear pins 166 can be properly engaged.

Immediately below the location of shoulder 155, the upper ring member 143 of the sealing device is provided with a transverse annular internal shoulder 181. Latch pin retaining recesses 167 are spaced below shoulder 154 by a distance such that, when shoulder 154 engages shoulder 155, the flat upwardly directed surface portions 174 of the tips of latch pins 168 will be located in a transverse plane below shoulder 181.

Accordingly, assuming that the sealing device 141 has been properly installed by means of tools 140 in the manner hereinbefore described, and that it is now desired to retrieve the sealing device, it will be apparent that screws 179 can be backed off manually, the tool 140 can then be lowered by means of the string of handling pipe until the tool comes into engagement with the upper ring member of the sealing device, and automatic latching of the pins 168 beneath shoulder 181 will then occur. In this connection, it will be understood that the latch pins 168 are biased to their projected positions and, as portion 153 enters the sealing device, the pins are first cammed inwardly because of engagement with shoulder 155 and then, when full engagement of shoulders 154 and 155 occurs, the latch pins spring automatically outwardly to engage beneath shoulder 181. Fluid can now be supplied under pressure down through the string of handling pipe and will be communicated to expansible chamber 161 via bore 163 and duct 164. Actuator ring 158 will accordingly be driven downwardly, engaging sleeve 150 and causing shear pins 151 to be ruptured. Further downward movement of ring 158 will drive sleeve 150 into camming engagement with the latch segments 148, accomplishing full retraction thereof in the same manner hereinbefore described with reference to operation of the tool disclosed in FIG. 6. With latch pin 148 fully retracted, an upward strain can now be applied to the handling string and the sealing device thus removed from the wellhead and retrieved.

Under the conditions of use of the tools of FIGS. 6 and 9 for handling well devices installed under water, lowering of the handling tool to the point of installation of the well device will always result in a substantial increase in fluid pressure applied exteriorly to such exposed elements as latch pins 168 and latch segments 148. If this increase in pressure is not communicated to the area behind the exposed element, descent of the handling tool will cause an increasing pressure differential effective to force the exposed element to its retracted position. Accordingly, each pin 168 is provided with an axial bore 182 communicating between the exposed tip of portion 172 and the portion of recess 167 behind the latch pin, so that the pressure differential is eliminated and spring 170 will be effective to bias the pin to fully projected position with flange 177 engaging ring 175. In the case of latch segments 148, for example, the spaces between the adjacent ends of the segments allow entry of fluid into groove 147 to prevent formation of a pressure differential which would force the segments inwardly. In this regard, it will be understood that segments 148 are arranged in the same fashion as segments 26, FIGS. 1, 2, 5 and 6.

Figure 11:
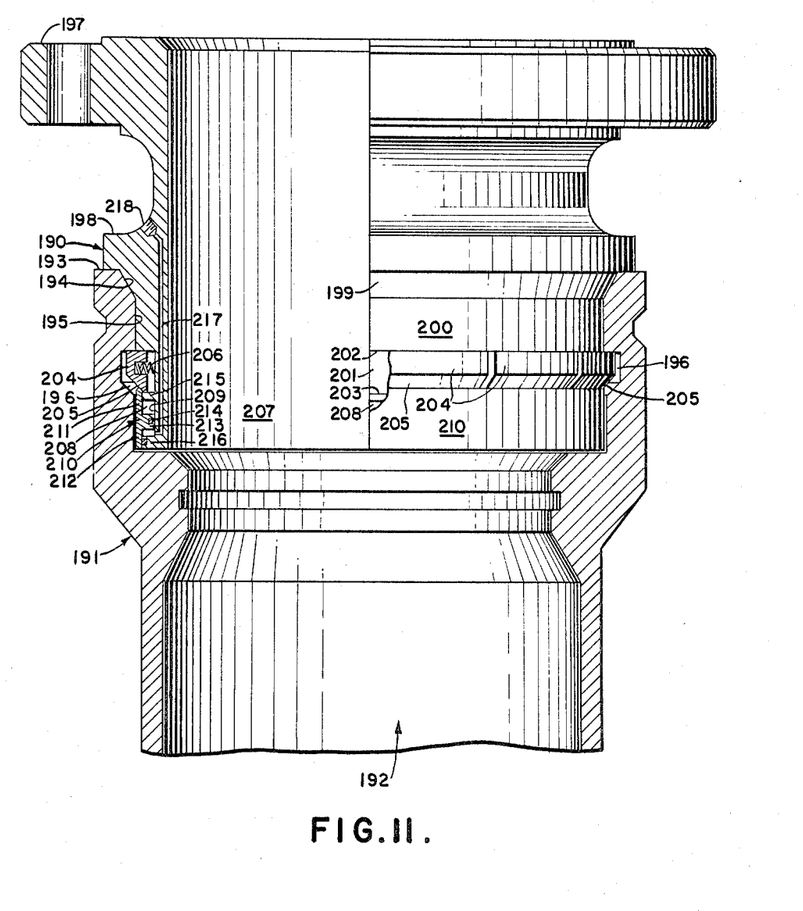
FIG. 11 is a view, partly in vertical section and partly in elevation, of two telescopically related wellhead members, constructed in accordance with another embodiment of the invention.

FIG. 11 illustrates another embodiment of the invention in which a flanged upper wellhead body 190 is supported by and secured to a lower, fixed wellhead body 191. Body 191 is generally tubular, having an upright passage 192 and, at the upper end of this passage, a flat transverse annular end face 193 and a downwardly and inwardly slanting frusto-conical shoulder 194. Passage 192 includes an upper right cylindrical portion 195 interrupted by a transverse annular inwardly opening groove 196.

Upper body member 190 has a bolt flange 197 and an intermediate outwardly projecting annular flange 198 adapted to seat directly on surface 193. Immediately below flange 198, body 190 has a downwardly and inwardly tapering frusto-conical shoulder 199 dimensioned to directly engage shoulder 194. Below shoulder 199, body 190 includes a portion having a right cylindrical outer surface 200 dimensioned to substantially completely fill passage portion 195 above groove 196. Surface 200 terminates at a transverse annular outwardly opening groove 201 having flat, parallel side walls 202 and 203. Groove 201 is so located that, when body 190 is landed with flange 198 engaging surface 193 and shoulders 199 and 194 in engagement, groove 201 will open outwardly toward groove 196.

Groove 201 accommodates an annular series of arcuate latching segments 204 arranged for radial sliding movement into and out of engagement with groove 196. Each segment 204 has an upper face adapted to engage beneath the uppermost wall of groove 196. Each segment also includes a downwardly and inwardly slanting lower cam face 205. The segments 204 are each biased outwardly, as by compression springs 206 engaged between the segments and the inner wall of groove 201.

Below groove 201, body 190 is of reduced diameter, so that there is an annular space between the lower end portion 207 of body 190 and the surrounding wall of passage portion 195. Lower end portion 207 is formed with an outwardly opening, transversely extending, arcuate recess 208 having a right cylindrical inner wall 209.

An actuating sleeve 210 surrounds lower end portion 207 of body 190 so as to be disposed within the annular space between the lower end portion of the wall of passage portion 195 and the outer surface of portion 207 of the upper body member. The upper portion 211 of sleeve 210 has right cylindrical inner and outer surfaces, as does the lower end portion 212 of the sleeve. Between these two portions, the sleeve is provided with an inwardly projecting transverse annular flange 213 having a groove at its inner periphery accommodating a suitable sealing ring 214. The dimensions of flange 213 are such that the sealing ring 214 directly engages surface 209 and establishes a fluid-tight seal between flange 213 and the lower portion 207 of body member 190. Portions 211 and 212 of sleeve 210 slidably engage portions 215 and 216, respectively, of the lower end portion 207 of the upper body member. A suitable duct 217 extends from a threaded port 218, adapted to receive a conventional hydraulic fitting, to the portion of recess 208 below flange 213. Accordingly, hydraulic pressure fluid supplied via duct 217 is effective to drive sleeve 210 upwardly.

Sleeve 210 extends upwardly through the annular space surrounding lower portion 207 of the upper body member and terminates adjacent to the cam faces 205 of latch segments 204. Accordingly, upward movement of sleeve 210, resulting when pressure fluid is supplied to duct 217, is effective to cam all of the segments simultaneously inwardly, out of engagement with groove 196, so that the upper body member 190 can be retrieved.

In the embodiment of FIGURE 11, both the actuating sleeve 210 and the hydraulic motor for driving the same are carried directly by the upper wellhead member 190, so that no separate tool is required to accomplish unlatching of the upper body member. It will be understood that any suitable hydraulic supply line, not shown, can be connected to duct 217 so that operation of sleeve 210 can be accomplished remotely. Though, in this embodiment, the sleeve 210 is part of a self-contained hydraulic motor, it will be noted that this sleeve still serves to close the annular space below the cam faces 205 of the segments, preventing entry of debris as the upper body member is lowered into place.

Figure 12:
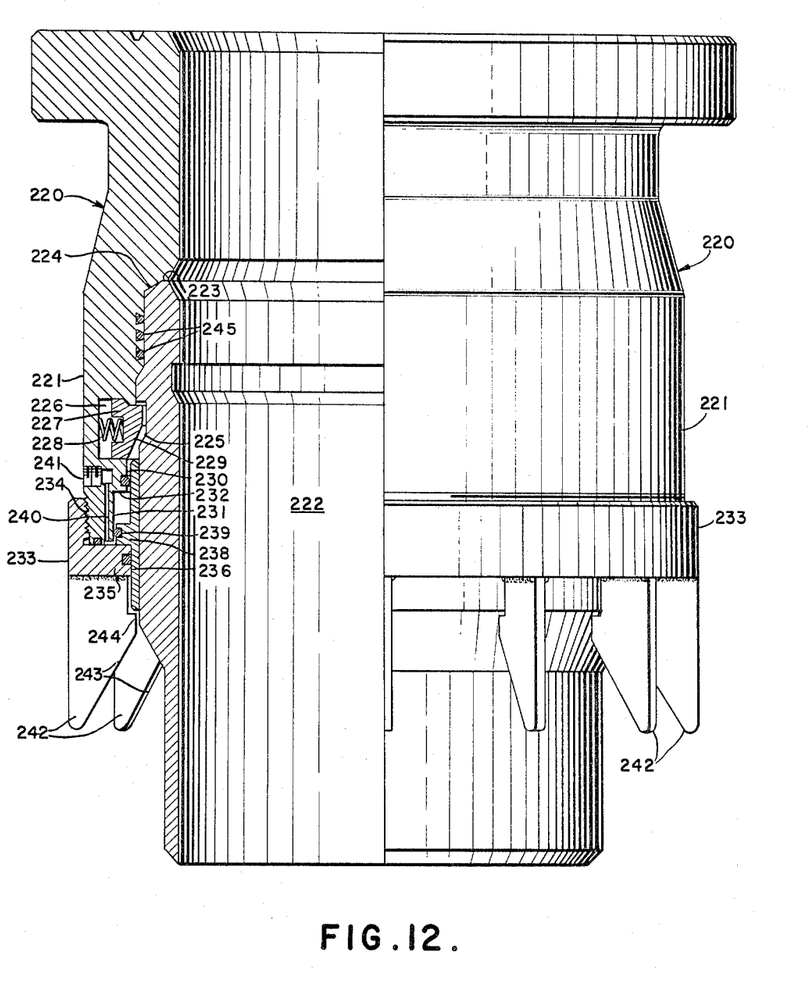
FIG. 12 is a view, partly in vertical section and partly in elevation, of a remotely operated wellhead connector constructed in accordance with another embodiment of the invention.

In the embodiment of the invention seen in FIG. 12, an upper body member 220 is provided with a dependent annular flange 221 adapted for telescopic engagement around the upper end of lower body member 222. The lower body member has a transverse annular flat end face 223 and a downwardly and outwardly slanting shoulder 224. Upper body member 220 is formed with a corresponding flat shoulder and downwardly and outwardly slanting frusto-conical shoulder so that the upper body member can be seated directly on the upper end of the lower body member, as shown.

Lower body member 222 is provided with an outwardly opening transverse annular groove 225. The skirt 221 of the upper body member has an inwardly opening transverse annular groove 226 slidably accommodating an annular series of latch segments 227. Groove 226 is so disposed that, when the upper body member has been seated on the upper end of the lower body member as shown, groove 226 opens directly toward groove 225. Latch segments 227 are biased radially inwardly of the assembly, as by compression springs 228, so that the latch segments snap into engagement in groove 225 once the upper body member has been properly landed. Each segment 227 has a lower cam face 229 which slants downwardly and outwardly.

Below groove 226, skirt 221 has a first portion presenting a cylindrical inner surface 230 spaced a small distance outwardly from the adjacent outer surface of lower body member 222. Below surface 230, skirt 221 is of enlarged inner diameter, presenting a cylindrical surface 231 which is spaced outwardly relative to surface 230. A downwardly facing transverse annular shoulder 232 joins surfaces 230 and 231. An end member 233 is rigidly attached to the lower end of skirt 221, as by threads at 234, and includes a portion 235 which projects inwardly of the assembly, terminating in a cylindrical inner surface 236 which is of the same diameter and coaxial with surface 230.

A sleeve 237 is disposed between body member 222 and skirt 221 below segments 227, substantially filling the annular space between surfaces 230 and 236, on the one hand, and the adjacent outer surface of body member 222, on the other. Sleeve 237 has a transverse annular outwardly projecting flange 238 disposed between shoulder 232 and portion 235 of end member 233. The flange 238 has an outwardly opening groove accommodating a sealing ring 239 which is maintained in engagement with surface 231. A duct 240, leading from a threaded port 241, communicates with the space immediately below sealing ring 239. Port 241 can accommodate any suitable hydraulic fitting so that a hydraulic line can be connected to supply pressure fluid via duct 240. Pressure fluid so supplied causes sleeve 237 to be driven upwardly, the upper edge of the sleeve engaging simultaneously the cam faces 229 of all of the segments 227 and so camming the segments radially outwardly to disengage them from groove 225 and free the upper body member 220 for retrieval.

In order to prevent accidental upward actuation of sleeve 237, a plurality of circularly spaced downwardly projecting fingers 242 are welded to the lower surface of member 233. Each finger 242 has an upwardly and inwardly inclined lower edge 243 and a portion 244 disposed below the lower edge of sleeve 237, so that, during downward movement of body member 220, obstacles which might otherwise engage sleeve 237 are deflected away and held out of contact with the sleeve by edges 243 and portions 244.

It will be understood that the coupling illustrated in FIG. 12 is useful in circumstances where only a low-pressure connection is required. Thus, a fluid-tight seal between the two body members above the latch groove can be accomplished in any suitable fashion, as by sealing rings 245.

While particularly advantageous embodiments have been chosen for illustrative purposes, it will be understood that various changes and modifications can be made therein without departing from the scope of the invention as defined in the appended claims.

What is claimed is:

1. In a well device for remote installation, the combination of
    an outer tubular member having an internal upwardly facing transverse seat and an inwardly opening transverse annular groove located above said seat;
    an inner member adapted to be inserted downwardly into said outer member and having
        a downwardly facing transverse annular shoulder to engage said seat for support of said inner member on said outer member, and
        a transverse annular outwardly opening groove located above said shoulder and disposed to face said inwardly opening groove when said shoulder is engaged with said seat;
    a plurality of arcuate latch elements arranged in a circular series in said outwardly opening groove and each disposed for movement generally radially of said inner member;
        each of said latch elements being biased outwardly and having a tip portion to engage in said inwardly opening groove to latch said inner member against upward movement relative to said outer member, said tip portion having an upwardly directed face extending transversely of said inner member for engagement beneath a similar, downwardly directed face of said inwardly opening groove,
        said inner member having a diameter above said outwardly opening groove which is smaller than the inner diameter of said outer member above said inwardly opening groove, whereby an annular upwardly opening space is provided between said inner and outer members,
    said latch elements each having a downwardly and outwardly slanting, upwardly directed cam face disposed to cross said annular space when the latch element is engaged in said inwardly opening groove,
        the upper one of the side walls of said outwardly opening groove being provided with a dependent peripheral lip disposed to retain said latch elements within said outwardly opening groove, said dependent lip being interrupted to provide a gate dimensioned to allow introduction of said elements individually into said outwardly opening groove;
    means fixed to said inner member and projecting into said outwardly opening groove between adjacent ones of said latch elements to prevent said elements from shifting to positions in which one thereof registers with said gate;
    a rigid annular member surrounding said inner member above said outwardly opening groove;
        said rigid member having a thickness such as to substantially fill said annular space and thereby block said space against entry of debris; and
    means releasably securing said rigid annular member to said inner member to normally retain said rigid annular member against downward movement;
        the upper end portion of said rigid annular member being disposed for engagement by a downwardly actuated annular element of a retrieving tool whereby, when said inner member is disposed with said shoulder engaging said seat and said latch elements engaged in said inwardly opening groove, said annular member can be released and driven downwardly through said annular space to engage said cam faces and so cam said latch elements inwardly to disengage the same from said inwardly opening groove;
    said inner member being hollow to accommodate a downwardly inserted retrieving tool and including internally disposed, inwardly directed latch means by which such tool can be connected thereto.

2. A well device according to claim wherein
    the upper end portion of said rigid annular member is cylindrical and of increased thickness and projects radially inwardly;
    the upper portion of said inner member is of reduced outer diameter and slidably embraced by said upper end portion of said rigid annular member; and
    said upper end portion of said rigid annular member has a circularly extending transverse upwardly directed end face presented for engagement by the downwardly actuated element of the retrieving tool.

References Cited by the Examiner

UNITED STATES PATENTS

| | | | |
|---|---|---|---|
| 1,587,079 | 6/1926 | Machino | 285—315 X |
| 2,092,116 | 9/1937 | Hansen | 285—315 X |
| 2,104,180 | 1/1938 | Barker | 285—143 X |
| 2,613,746 | 10/1952 | Whitney | 166—136 |
| 2,904,357 | 9/1959 | Knox. | |
| 3,050,140 | 8/1962 | Hayes. | |
| 3,052,299 | 9/1962 | Geer. | |
| 3,071,188 | 1/1963 | Raulins. | |
| 3,171,674 | 3/1965 | Bickel | 285—133 X |

CARL W. TOMLIN, *Primary Examiner.*

S. R. MILLER, R. GIANGIORGI, *Assistant Examiners.*